3,004,042
FREE RADICALS OF 4,4'-BIS(2,6-DI-TERT-ALKYL-HYDROXYPHENYL) AMINES
Galvin M. Coppinger, Oakland, Calif., assignor to Shell Oil Company, a corporation of Delaware
No Drawing. Filed Sept. 15, 1958, Ser. No. 760,834
7 Claims. (Cl. 260—396)

This invention relates to novel free radicals and to a process for their preparation. More particularly it relates to new free radicals which are stable and which have useful properties as additives.

In general, free radicals exist in solution for very brief periods because of their great reactivity. A few stable free radicals capable of being isolated have been prepared but they have been, in general, quite reactive with oxygen and have therefore been of limited utility.

It is an object of this invention to provide stable free radicals. Another object of the invention is the provision of a process for preparing stable free radicals. Still another object of the invention is the use of such stable free radicals as additives to hydrocarbon liquids, including gasoline and oil. Other objects will appear from the following description of the invention.

These objects are accomplished in my invention by stable free radicals having the formula

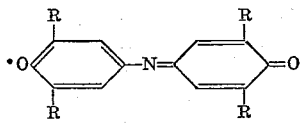

wherein R is a tertiary alkyl group such as dimethyl ethyl carbinyl, diethyl methyl carbinyl, methyl ethyl isopropyl carbinyl, tert-butyl and the like. The R's may be the same or different tertiary alkyl radicals, but it is preferred that they be the same and have less than 8 carbon atoms. It is particularly preferred that the R's be tertiary butyl radicals because the starting materials for the preparation of the radical are both plentiful and inexpensive.

It is one of the principal advantages of this invention that the novel stable free radicals are quickly and simply prepared in quantitative yields by reacting together an amine having the formula

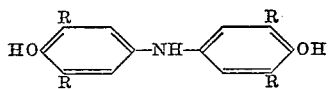

wherein the R's have the significance noted above, with an oxidizing agent. Typical 4,4'-bis(2,6-di-tert-alkyl-1-hydroxyphenyl)amines of the type represented by the formula include 3,3',5,5'-tetra-tert-amyl-4,4'-dihydroxydiphenylamine; 3,5 - di-tert-amyl-3',5'-di-tert-butyl-4,4'-dihydroxydiphenylamin; 3,3'-di-tert - amyl-5',5'-di-tert-butyl-4,4'-dihydroxydiphenylamine; and 3,3',5,5'-tetra-tert-butyl-4,4'-dihydroxydiphenylamine.

In preparing the novel stable free radicals of my invention, the given amine is merely reacted with an oxidizing agent in the presence of a solvent for both the oxidizing agent and the amine. Examples of suitable oxidizing agents include tetravalent lead compounds, such as lead dioxide and lead tetraacetate, hydrogen peroxide, organic hydroperoxides having the formula R'—O—OH such as t-butyl hydroperoxide, organic peracids including perbenzoic, peracetic, and monoperphthalic acids, Fenton's Reagent, and the like. In particular, I have found that excellent results may inexpensively be obtained by employing as an oxidizing agent an alkali metal ferricyanide in basic solution, for example, potassium ferricyanide in the presence of KOH or NaOH. The oxidation may also be conveniently carried out in two steps, whereby the di(3,5-di-tert-alkyl-4-hydroxyphenyl)amine is first oxidized to the N(3,5-di-tert - alkyl-4-hydroxyphenyl)-2,6-di-tert-butyl quinone imine-1,4 compound in situ with air, and the quinone imine is then oxidized to the free radical with one of the oxidizing agents noted.

The reaction proceeds readily at ambient temperatures, although higher or lower temperatures may be used if desired. Ordinarily about 1 to 2 hours are required for the reaction to proceed to completion. After the reaction is complete, the free radicals are present in the reaction mixture in substantially quantitative yields and may be readily recovered by standard organic chemical procedures.

The stable free radicals so produced are characteristically colored crystalline solids which are readily soluble in common organic solvents such as ethers, alcohols and hydrocarbons. As solids, they display the singular property of being inert to environmental oxygen, and they therefore may be stored almost indefinitely in the dry state. Inasmuch as they are somewhat reactive to oxygen in solution, they are quite useful as antioxidants for hydrocarbon liquids such as gasoline and fuel and lubricating oils. I have found that amounts of the free radical in excess of about 0.1%, based on the hydrocarbon, will give enhanced stability to the hydrocarbon. The addition of the novel free radicals of my invention to gasoline in no way impairs the performance of gasoline as a fuel. In addition to my novel free radicals, the gasoline compositions may include other additives, such as tetraethyl lead or other organometallic compounds, metal deactivators such as N,N'-di-salicylal-1,2-propanediamine, rust inhibitors such as polymerized linoleic acids and N,C-di-substituted imidazolines, anti-icing additives such as isopropyl alcohol and N-alkyl alkylenediamines, dyes, and the like.

To illustrate the manner in which the invention may be carried out, the following examples are given. It is to be understood, however, that the examples are for the purpose of illustration only, and the invention is not to be regarded as limited to any of the specific materials or conditions recited therein. In the examples, the parts given are by weight unless otherwise noted.

EXAMPLE I

In general, the free radical may be prepared by converting a substituted phenol to the corresponding p-nitrosophenol, reducing the p-nitrosophenol to the p-aminophenol which is in turn converted to the N(substituted phenol)quinone imine, and oxidizing the quinone imine to the free radical. The sequence of these steps will be described below.

(A) 2,6-di-t-butyl-4-nitrosophenol

One mole of 2,6-di-t-butylphenol was dissolved in one liter of ethanol containing 0.55 mole of $H_2SO_4$. Into the resulting solution was poured a solution of one mole of $NaNO_2$ in 200 ml. of water, the addition being carried out slowly at 0–10° C. A half liter of water was then added to the reaction mixture to precipitate the nitrosophenol. The crude product was obtained in better than 90% yield and was recrystallized from ethanol-water solution to give a final yield of 75–80%.

Analysis of the product yielded the following data:

| Percent | C | H | N |
|---|---|---|---|
| Calculated for $C_{12}H_{22}O_2N$ | 71.5 | 8.7 | 5.95 |
| Found | 71.5 | 9.1 | 5.87 |

The principal by-product was 3,3',5,5'-tetra-t-butyl-diphenoquinone.

(B) 2,6-di-t-butyl-4-aminophenol

The 2,6-di-t-butyl-4-nitrosophenol produced in the previous step was dissolved with heating in one liter of ethanol. To this solution a solution of sodium hydrosulfite was added until the resulting mixture was colorless. An aqueous solution of $Na_2CO_3$ was then added to the mixture to render it basic to litmus, and the precipitate which formed was filtered and washed with water, giving a yield of about 90%. The amine was recrystallized from isooctane.

The aminophenol is extremely sensitive to air oxidation and is therefore best handled in such hydrocarbon solvents as anhydrous hexane, isooctane or benzene.

(C) N-(3,5-di-t-butyl-4-hydroxyphenol)-2,6-di-t-butyl quinone imine-1,4

The isooctane solution of the 2,6-di-t-butyl-4-aminophenol prepared in the previous step was gently heated under reflux for up to five days, until the evolution of ammonia had ceased, yielding di(3,5-di-t-butyl-4-hydroxylphenyl)amine. The isooctane solution of the amine was then sparged with air to produce the quinone imine, the oxidation at room temperature being complete in four hours. The quinone imine was recovered by distilling off the solvent under reduced pressure and was recrystallized from isooctane in 60–75% yield. The following analytical data for the quinone imine were obtained:

| Percent | C | H | N |
|---|---|---|---|
| Calculated for $C_{24}H_{41}O_2N$ | 79.4 | 9.8 | 3.3 |
| Found | 79.5 | 9.8 | 3.2 |

(D) Preparation of the free radical

The quinone imine was converted to the free radical by oxidation with $PbO_2$ in ether. To a 200 ml. ether solution containing 10 grams of the imine prepared in the previous step was added at room temperature with stirring a large excess of $PbO_2$, the addition being conducted over a period of 6 hours. The lead dioxide was then filtered from the solution and the solvent removed under reduced pressure, leaving as a residue the free radical in about 90% yield. Its structure,

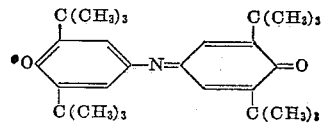

was determined by infrared analysis.

The free radical was recrystallized repeatedly from acetone to obtain a sample which was "paramagnetically" pure. The structure shown above was confirmed by electron paramagnetic resonance.

EXAMPLE II

The intermediate N(3,5-di-t-butyl-4-hydroxyphenyl)-2,6-di-t-butyl quinone imine was prepared by the methods of the previous experiment. To a solution of 150 ml. of benzene containing 10 grams of the quinone imine was added 150 ml. of water containing 32 grams of potassium ferricyanide and 6.4 grams of potassium hydroxide. The two solutions were shaken together for two hours, allowed to separate, and the benzene removed from the hydrocarbon phase under reduced pressure. The stable free radical was obtained in about 90% yield and recrystallized from acetone. Analysis of the purified product gave the following data:

| Percent | C | H | N |
|---|---|---|---|
| Calculated for $C_{24}H_{40}O_2N$ | 79.5 | 9.5 | 3.31 |
| Found | 79.7 | 9.6 | 3.46 |

The structure noted in Example I was confirmed in this sample by infrared analysis. Dry samples of the free radicals prepared in Examples I and II have been stored in air at room temperature for periods in excess of six months without detectable deterioration.

EXAMPLE III—FREE RADICALS AS INHIBITORS

A sample of a commercial gasoline consisting primarily of a mixture of about 10% butane, about 30% straight run gasoline, about 20% sweetened thermal and catalytically cracked light pentanes, about 20% thermally cracked gasoline, and the remainder of hydrogenated catalytically cracked gasoline was thoroughly washed to remove natural and added inhibitors. Small amounts of three inhibitors were then added in known concentrations, 10 mg./dl., to portions of the gasoline so treated, and the induction periods for the inhibitors determined. The determination was made by sealing the gasoline containing the inhibitor in a bomb provided with pressure recording means, pressuring the bomb to 100 p.s.i.g. with gaseous oxygen, and immersing the bomb in a boiling water bath. The induction periods listed below are the times which elapsed between immersion and the time at which each sample began to absorb oxygen at a rate exceeding 2 p.s.i. in 15 minutes. The following table lists the antioxidants tested and their induction periods in comparison with the inhibition period for washed, uninhibited gasoline.

| Antioxidant: | Induction period, hrs. |
|---|---|
| None | 1.25–1.33 |
| Stable free radical derived from bis-4,4'-(2,6-di-tert-butyl-1-hydroxyphenyl)amine | 4.0–4.17 |
| N,N-di-sec-butyl-durenediamine | 1.7 |
| 2-methyl-4,6-di-t-butylphenol | 4.83 |

I claim as my invention:

1. The stable free radical of the formula

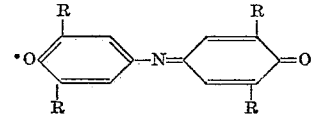

wherein each R is tertiary alkyl.

2. The stable free radical of the formula

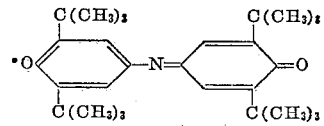

3. The process for the preparation of the free radical of claim 1 which comprises reacting 4,4'-bis(2,6-di-tert-alkyl-1-hydroxyphenyl)amine in the presence of the metal salt oxidizing agent selected from the group consisting of lead dioxide, lead tetraacetate and basic alkali metal ferricyanide.

4. The process of claim 3 wherein each tertiary alkyl radical is tertiary butyl.

5. The process of claim 3 wherein the oxidizing agent is lead dioxide.

6. The process of claim 3 wherein the oxidizing agent is potassium ferricyanide.

7. The process for the preparation of the free radical of claim 1 which comprises oxidizing di(3,5-di-tert-4-hydroxyphenyl)amine with air to yield N-(3,5-di-tert-4-hydroxyphenyl)-2,6-di-tert-butyl quinone imine-1,4, and oxidizing the quinone imine to the free radical with the inorganic salt oxidizing agent selected from the group consisting of lead dioxide, lead tetraacetate and basic alkali metal ferricyanide.

(References on following page)

References Cited in the file of this patent

UNITED STATES PATENTS

| | | |
|---|---|---|
| 895,689 | Schlenk | Aug. 11, 1908 |
| 1,572,417 | Bates | Feb. 9, 1926 |
| 2,095,211 | Chebotar | Oct. 5, 1937 |
| 2,137,175 | Martin | Nov. 15, 1938 |
| 2,785,188 | Coe | Mar. 12, 1957 |

FOREIGN PATENTS

| | | |
|---|---|---|
| 23,994 of 1902 | Great Britain | Sept. 3, 1903 |
| 33,394 | Netherlands | Aug. 15, 1934 |

OTHER REFERENCES

Gies et al.: Annalen, vol. 578, pp. 11–24 (1952).
Kharasch et al.: J. Org. Chem., vol. 22, pp. 1439–1443 (1957).